United States Patent Office 3,126,827
Patented Mar. 31, 1964

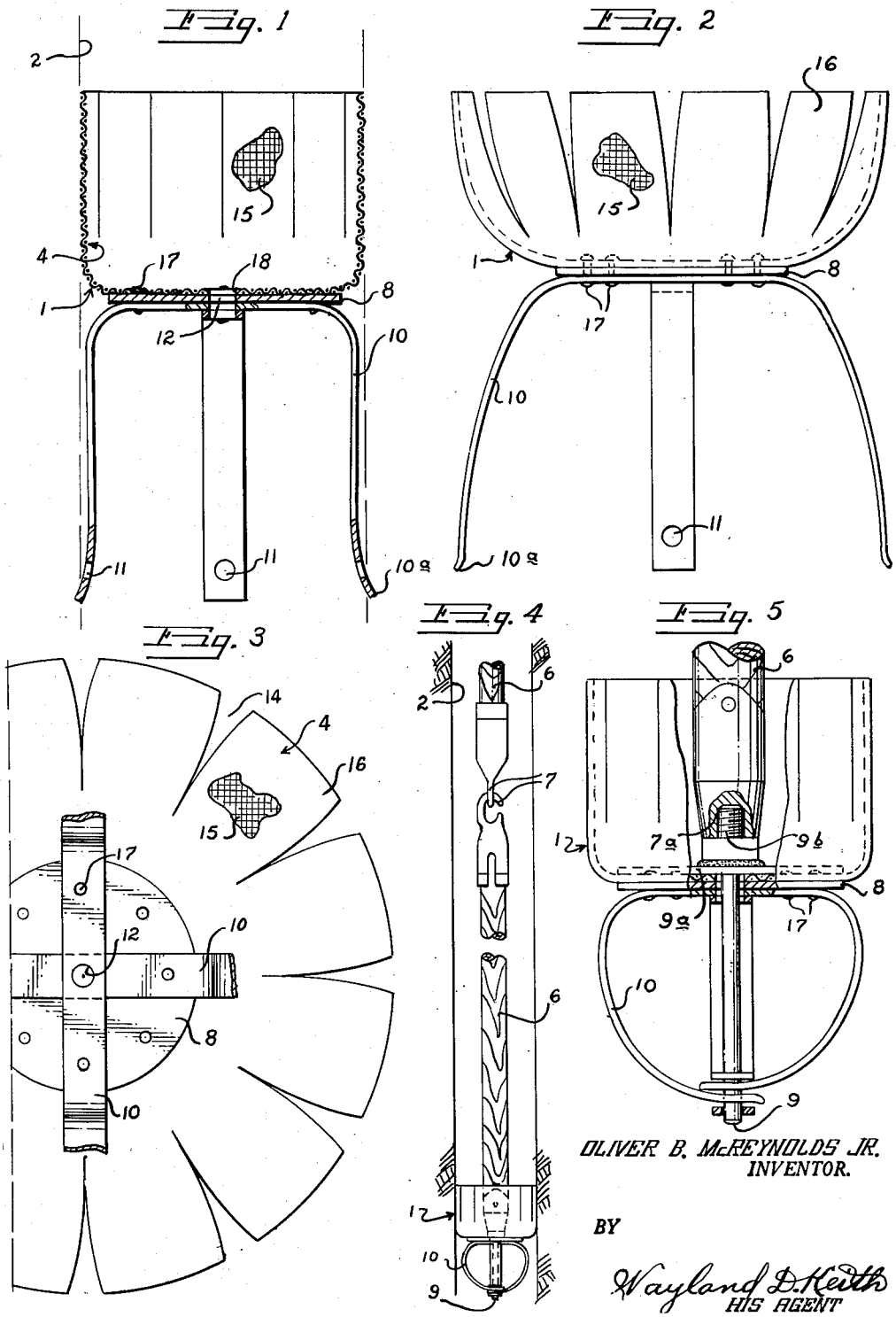

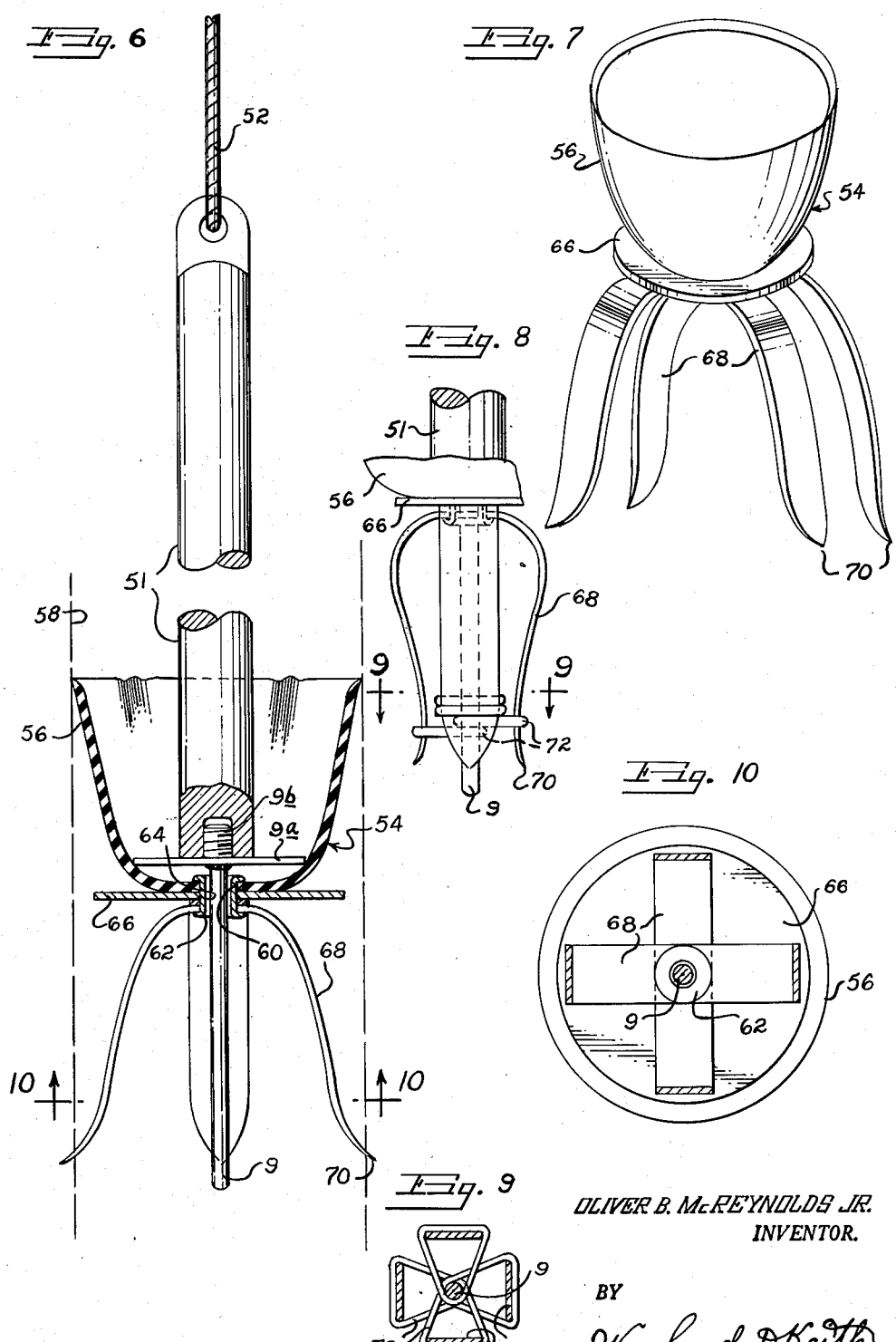

3,126,827
BRIDGE PLUGS
Oliver B. McReynolds, Jr., P.O. Box 1235,
Palestine, Tex.
Filed Jan. 16, 1961, Ser. No. 83,050
7 Claims. (Cl. 102—30)

This invention relates to a plug to be used for sealing a bore hole against surface erosion or for establishing a bridge at any desired depth in the bore hole that may have been drilled for geophysical or geological exploration.

Various methods have been used heretofore for plugging exploration bore holes, but many of these methods were inadequate because, if the plug was set in the hole in such manner as to close the bore hole against erosion and encroachment of water and the like, it was often impossible to remove such plug to re-enter the hole. If the plug was such that it could be removed for re-entry into the hole, it often collapsed and permitted water to enter the hole which frequently caused the caving thereof, therefore the hole, which may have cost from hundreds to thousands of dollars to drill, would be lost. The present plug is so designed that it may be seated at the desired depth in the hole and will close the bore hole so that it may be filled to prevent encroachment of water, but still enable the plug to be readily removed and the hole salvaged without damage thereto.

An object of this invention is to provide a bridge plug for a bore hole of a well, which will close the bore hole in such manner as to hold a bridge of earthen material or the like therein, so that surface erosion will not result, and so as to maintain the bore hole in re-usable condition over a long period of time.

Another object of the invention is to provide a bridge plug for closing the bore hole of a well, which plug is light in weight, and which may be readily deformed to enable cluster packing, and which is low in the cost of manufacture.

A further object of the invention is to provide a bridge plug for bore holes which is light and strong, and which is so constructed as to be resistant to deterioration by water or corrosion.

Still another object of the invention is to provide a bridge plug which may be run into the bore hole expeditiously, which plug may be set and anchored at a given place within the hole, and which will stay in set position under most operating conditions.

Yet another object of the invention is to provide a bridge plug for a bore hole, which plug may be readily removed by conventional means with a minimum of damage to the bore hole.

Another object of this invention is to supply an inexpensive, durable, compact unit to bridge or plug exploration bore holes at any desired depth, so as to prevent encroachment of water into the bore hole and also prevent erosion of the earth surface surrounding the bore hole.

Yet another object of the invention is to fabricate a bridge plug which is light in weight and which is so compact that a quantity of these plugs may be clustered for transportation to be used in seismic exploration or in other types of geophysical exploration.

It is also an object of this invention to provide a bridge plug which is simple in construction, easy to set, with a minimum effort, to close a bore hole in a permanent manner.

A further object of this invention is to provide a bridge plug which may be set in the bore hole at a deep depth by the use of a weighted line.

Another object of this invention is to provide a bore hole plug which is easily and readily drillable, should re-entry into a previously plugged hole become necessary or desirable.

A further object of this invention is to supply an inexpensive bridge plug, which requires no adjusting or modifying in order to securely close an exploration bore hole, even though the hole is larger than a hole into which the bridge plug is normally run.

With these objects in mind and others which will become manifest as the description proceeds, reference is to be had to the accompanying drawings, in which two embodiments of the invention have been disclosed and in which like reference characters designate like parts in the several views thereof, in which:

FIG. 1 is a longitudinal, sectional view embodying one form of the invention, which shows a bridge plug positioned within the bore hole of a well, with the plug being shown in "set" position;

FIG. 2 is an elevational view of the invention in expanded condition, prior to the entrance thereof into the bore hole of a well;

FIG. 3 is a fragmentary bottom sectional view of the plug in flattened position, and showing parts of the wall engaging members as being broken away;

FIG. 4 is a longitudinal section through a portion of a bore hole of a well, and showing how the bridge plug is run thereinto by the use of a loading pole;

FIG. 5 is an elevational view of the bridge plug with the wall engaging members in retracted position on a loading pole setting spear, and showing portions of the bridge plug and loading pole as being broken away to show the details of construction;

FIG. 6 is a view similar to FIG. 1, but of a modified form of the invention, showing a sinker bar attached to the plug and being positioned within the bore hole of the well;

FIG. 7 is a perspective view of the modified form of the invention in expanded condition;

FIG. 8 is a fragmentary view of the modified form of the bridge plug, with parts broken away and with parts shown in section to bring out the details of construction, and showing the wall engaging members of the plug in retracted position;

FIG. 9 is a sectional view taken on the line 9—9 of FIG. 8, looking in the direction indicated by the arrows; and FIG. 10 is a sectional view taken on the line 10—10 of FIG. 6, locking in the direction indicated by the arrows.

With more detailed reference to FIGS. 1 through 5 of the drawings, a bridge plug is disclosed which will close the bore hole of a well. It is frequently necessary or desirable to close the bore hole of a well at or near the top thereof, or at any intermediate position within the depth thereof, the purpose of which will be brought out hereinafter. However, it is particularly desirable to form a bridge plug on which an explosive charge may be placed, which charge may be detonated to produce seismic waves, which waves are recorded on geophysical instruments, thereby making it possible to determine the geological formation and the disposition thereof, thereby enabling accurate and expeditious correlation of the subsurface strata. Furthermore, the bridge plug may be utilized to close the bore hole of a well after the bore hole has served its purpose in exploration or the like.

The plug, as shown in FIGS. 1 through 5, is designated generally by the numeral 1, and is shown to be positioned within a bore hole 2, FIGS. 1 and 4. It is preferable to make the plug of formable material, such as mesh wire, which may be coated with a plastic material while in a flat sheet. The formable material, designated generally at 4, may then be cut so it may be formed from a relatively flat disc-like member, as shown in FIG. 3, to a cupped member as shown in FIG. 2. Then by forcing the plug 1, thus formed, into the bore hole of a well by means of a loading pole 6, the cupped portion, as shown in FIG. 2, will conform to the size and shape of the bore hole 2 and will form a relatively tight fit with the walls thereof. It is preferable to have a circular plate 8, or other reinforcing means on the lower side of the formable material to which plate resilient, wall engaging members 10 which members are relatively thin tines of spring-like material are secured and to the circular plate 8. The plate 8 is apertured, as indicated at 12, for the passage of a setting tool or spear 9 therethrough, as will be more fully brought out hereinafter.

The wall engaging members 10 may be secured to the plate 8 and to the formable material 4, as by welding or the like, or the members 8 and 10 may be made integral, and secured to the formable material.

The formable material 4 is substantially in the form of a circular disc, as shown in FIG. 3, with circumferentially spaced notches 14 cut therein in such manner as to be substantially radial with the axis of the disc, to form petals or tongues 16. It is preferable that these notches be V-shaped or arcuate, so when the formable material is formed into a cup, as shown in FIGS. 2 and 5, the edges of the tongues will overlap or join in close fitting relation, so when an earthen load is placed thereon, the individual tongues 16 will fit snugly against the wall of the bore hole, and as the load material becomes wetted and the weight on the plug increases, the wall engaging members or tines 10 will be pressed outward so that the ends thereof will dig into the formation of the wall of the bore hole of the well to hold the plug and the load thereon firmly in place.

One manner of forming the formable material 4 from a flat sheet into the cup-shaped plug, comprises the steps of coating a mesh wire-like material which may be woven wire, or expanded or perforated metal, with a resinous material, such as epoxy resin, or one of the various vinyl or polyester plastics, or rubber, until the mesh material is substantially covered and is impervious to water, but which is still yieldable for forming without breaking the plastic coating, or if the conditions so indicate, the formable cup material may also be made of any type rubber or plastic compound or other material, which is flexible, but which has a comparatively long life expectancy under conditions which will be encountered when placed in the ground, either with or without reinforcing material therein.

The sheet 4 is then cut into a circular disc and notched or cut away as indicated at 14, usually the notch is about one-fourth the diameter of the disc, then a circular, apertured disc 8 may be secured thereto, if additional strength is needed. The wall engaging members 10 are secured to the disc 8 by means of rivets or bolts 17 or by welding. The wall engaging members 10 may be secured beneath the cup of formable material of the plug 1, or by being formed integrally with the cup.

The disc which is formed from the formable material 4 is perforated, as indicated at 18, which perforations will register with perforations 12 of reinforcing member 8. The perforations 12 and 18 are only slightly larger than the setting spear 9, which will enable the ready insertion of the spacer 9 through the perforations 12 and 18 and its removal therefrom.

By having the sheet of formable material 4 of plastic, or mesh wire, which mesh wire may be coated with an elastomer or pliable material, the plug 1, which is formed therefrom, will move into the well or bore hole when the wall engaging members 10 are in retracted position, as shown in FIGS. 4 and 5. However, when the loading pole 6 is moved upward, the outer edges of the formable material 4 of the plug 1 will have a tendency to engage the wall of the bore hole, and will permit spear 9 to be moved upward until the lower end thereof becomes disengaged from the apertures 11 near the respective distal ends of the member 10; whereupon, the wall engaging members 10 will spring outward from the position as shown in FIG. 4 into the position as shown in FIG. 1, which will prevent downward movement of the plug when a load is placed thereon.

OPERATION

In order to set a bridge plug in a well, it is often desirable to use a loading pole, such as indicated at 6, which loading pole has portions thereof provided with interlocking hooks 7, to enable these portions to be joined in end-to-end relation, until the pole is of sufficient length to be run into the bore hole 2 of the well to the desired depth. These loading poles are usually made of wood and may have a screwthreaded socket 7a, FIG. 5, for the attachment thereto of a setting spear 9. The setting spear 9 preferably has a disc-like plate 9a on the upper end thereof, which plate 9a is slightly smaller than the bore hole of the well 2. A screw threaded spud 9b is secured immediately above plate 9a so the spear 9 may be screwthreaded to loading pole 6, to enable the plug 1 to be set in the hole at the desired depth.

Each wall engaging member 10 has an aperture 11 formed through the distal end thereof, so the wall engaging members may be curved inward to enable the plug setting spear 9 to pass through the apertures 11 to hold the members 10 in retracted position, as shown in FIGS. 4 and 5. It is preferable to have the wall engaging members 10 of resilient material, such as spring steel, so they may be relatively light in weight, yet have sufficient resiliency to cause the points 10a thereof to be forced into engaging relation with the wall of the well when the setting spear 9 is moved upward and out of engagement with the apertures 11 in the distal ends of the members 10.

In this manner the bridge plug may be set and held at the desired place within the bore hole to perform the function desired, that is, to plug the hole, to support an explosive charge, or whatever function is to be performed thereby. It is to be appreciated that the setting tool is readily and easily removed. Although the well may have been drilled to a depth of four or five hundred feet, it may be desirable to form a charge bridge for an explosive charge at any point within the depth thereof, and since the bore hole is filled with drilling fluid, it is necessary to use a plug which may be run into the drilling fluid and be set, which plug will hold the explosive charge either with or without an earthen load thereon.

Furthermore, it may be desirable to locate a charge at a given depth, a spaced distance above the bottom of the bore hole, and to place a bridge plug thereabove with an earthen barrier or the like thereon, so as to confine the explosion to a certain portion of the well or to direct the force of the explosive downward. The present plug is so designed that it may be set in a manner to give the desired result. The present plug will also effectively seal the bore hole against damage by the elements, so that it may be re-entered, if desired. The present plug is sufficiently inexpensive as to be expendable if it is desired to re-enter the hole, and it is not difficult to remove or to drill through.

MODIFIED FORM OF INVENTION

The form of invention as shown in FIGS. 6 through 10 utilizes a setting tool, such as a loading pole described for the form of invention as set out above, or the plug may be moved into the bore hole of the well by means of a sinker bar which is designated generally at 51, which sinker bar 51 has a rod or spear point 9 screwthreaded onto the lower end thereof, and which sinker bar may be lowered into the bore hole of the well by a cable 52, so as to move the plug, designated generally at 54, to the desired level therein. The present plug accomplishes substantially the same results as the above described form of plug; however, it is preferable to have the cup 56 of the plug 54 made of formable material, such as rubber or synthetic rubber or other elastomer material, so that the upper edge of the cup is larger than the diameter of the hole into which it is to be run. Due to the elasticity of the material from which the cup 56 is formed, the peripheral edge thereof will snugly fit the bore hole, designated generally at 58, as it is run thereinto. The cup 56 is substantially closed at the lower end except for axial aperture 60. A fastening element 62 extends through the aperture 60 and through an aperture 64 which is formed in a disc 66 positioned immediately adjacent the closed portion of the cup member 56, the upper portion of which cup is outwardly sloping. A pair of apertured, spring-like members 68 is positioned immediately below disc 66 so that the apertures thereof will register with the aperture in disc 66 and are fitted on fastening means 62, which fastening means is out-turned at the lower end thereof so as to form a composite unit.

The spring-like members 68 extend downward and are curved outwardly, and preferably have out-turned points 70 which are adapted to engage the walls of well 58 when the tool is in set position. However, while the tool is being run into the bore hole, the spring-like members 68 are held in retracted position, as shown in FIG. 8 by means of looped members 72, one of which looped members is provided for each wall engaging, spring-like member 68, and which member 72 is adapted to surround an individual wall engaging member 68 and the spear point 9 of the setting tool. In this manner each of the wall engaging members 68 is individually moved inward and held in place by the respective looped members 72, as will best be seen in FIGS. 8 and 9. When the wall engaging members are held in this position, the bridge plug is ready to be run into the bore hole or shot hole, either by a loading pole as described above, or by the use of a sinker bar 51 and cable 52, if the depth at which the plug is to be set exceeds the normal depth for which loading poles are used. In this manner a bridge plug 54 may be inexpensively set several hundred or several thousand feet into the bore hole of a well, and in such manner that it will perform the desired function, when shooting a well, or such other operation as the particular drilling operation indicates, if the cost of an expendable bridge plug is a factor requiring consideration.

It is to be pointed out that the plate or disc member 66, which is positioned immediately below the elastomer cup 56, is relatively light in weight and is slightly smaller in diameter than the bore hole in which it is to be used. However, it is of sufficient strength to support the load placed within the cup 56, so a bore hole bridge of desired depth may be built thereonto. The member 66 may be of sufficient rigidity to support an earthen load or a cement load, in a manner well understood in the art of well completion, or it may be used to support explosives or "shots" when used in a shot hole for geophysical exploration, or it may be used in many other ways which are well known in the trade.

When the plug has reached the desired depth within the bore hole, it is time to release the plug from the spear 9, which spear may be threaded onto the lower end of a loading pole 6 or onto a sinker bar 51, as indicated at 9b, the loading pole or sinker bar is moved upward, which upward movement will cause the spear 9 to slide upward within loops 72 until the spear 9 moves out of loops 72, whereupon each spring-like wall engaging members 68 will spring outward to permit wall engaging points 70 thereof to engage the wall of the well 58 to prevent downward movement of plug 54, whereupon the loading pole 6 or sinker bar 51 may be withdrawn from the well, at which time the bridge plug 54 is set within the bore hole and ready to be used to perform the desired function.

With the bridge plug 54 in place, an earthen load may be placed thereon, which will cause the elastomer material of the cup to expand outward into close contact with the wall of the well, thereby to prevent leakage of liquid past the plug into the bore hole, thereby the erosion or "washing out" of the bore hole therebelow will be prevented, and caving, which is usually incident to infiltration of water or other liquid into the bore hole, will also be prevented. However, with or without an earthen load, the bridge plug will support an explosive charge, either for geophysical exploration or for supporting an explosive charge of such magnitude as is used in "shooting a well," such as an oil well to break down the formation in such manner as to increase the productivity thereof.

It is to be particularly pointed out that a plug of this character, or a plug of the character described above, are low cost products, which are expendable and which will perform the various functions as set out above in a satisfactory manner, at a fraction of the cost of devices for the purpose heretofore in use.

While the invention has been described and illustrated in two different forms, it is to be understood that modifications of these forms may be made in the minor details of construction and adaptations made to different installations and to particular conditions encountered without departing from the spirit of the invention or the scope of the appended claims.

Having thus clearly illustrated and described the invention, what is claimed as new and desired to be secured by Letters Patent is:

1. A bridge plug for the bore hole of a well, which bridge plug comprises:
    (a) a formable wall engaging element of impervious material, which element is of a diameter at least the diameter of the bore hole in which it is to be used,
        (1) said formable wall engaging element being centrally apertured to receive a bridge plug moving means,
    (b) resilient wall engaging tines secured to said formable wall engaging element, which resilient wall engaging tines normally extend outwardly and downwardly therefrom,
    (c) bridge plug moving means attachably connected to said bridge plug to move said bridge plug into the bore hole of a well,
    (d) means on the lower ends of said wall engaging tines to engage said bridge plug moving means to retain said tines out of engagement with the wall of said bore hole when said bridge plug moving means is in one position and to release said tines when said bridge plug moving means is moved upward relative to said formable wall engaging element so as to release said tines to engage the wall of the bore hole.

2. A bridge plug for the bore hole of a well, as defined in claim 1; wherein
    (a) a reinforcing member is centrally apertured and is positioned below and adjacent said formable wall engaging element and is detachably secured to said bridge plug moving means, and wherein
    (b) said wall engaging tines are fixedly secured to said reinforcing member and extend radially therefrom.

3. A bridge plug for the bore hole of a well, as defined in claim 1; wherein
    (a) said bridge plug moving means is a loading pole,
        (1) said loading pole being made in detachable sections so the length thereof may be varied.

4. A bridge plug for the bore hole of a well which bridge plug comprises:
    (a) an expendable, cup-shaped, elastomer member,
        (1) which member is axially apertured,
    (b) elongated bridge plug moving means,
    (c) a pin extending from the distal end of said elongated bridge plug moving means,
        (1) said pin extending through said axial aperture in said bridge plug when said pin is in one position, (d) an axially apertured reinforcing member positioned below and being secured to said cup-shaped member and having the aperture thereof in register with the aperture of said elastomer member and being adapted to receive said pin of said bridge plug moving means therethrough, (e) resilient wall engaging tines secured integrally to said reinforcing member and extending radially outward therefrom, (f) loop means surrounding each said tine and said pin on said bridge plug moving means to hold said wall engaging tines in retracted position while said bridge plug is being lowered into the bore hole of a well, (1) said loop means being releasable from said pin upon upward movement of said bridge plug moving means to release said resilient wall engaging tines.

5. A bridge plug for the bore hole of a well, which bridge comprises:

(a) an expendable, cup-shaped, elastomer member,
(1) which member is axially apertured, (b) elongated bridge plug moving means, (c) a pin extending from the distal end of said elongated bridge plug moving means,
(1) said pin extending through said axial aperture in said bridge plug when said pin is in one position, (d) an axially apertured reinforcing member positioned below and being secured to said cup-shaped member and having the aperture thereof in register with the aperture of said elastomer member being adapted to receive said pin of said bridge plug moving means therethrough, (e) resilient wall engaging tines secured integrally to said reinforcing member and extending radially outward therefrom, (f) loop means surrounding each said tine and said pin on said bridge plug moving means to hold said wall engaging tines in retracted position while said bridge plug is being lowered into the bore hole of a well,
(1) said loop means being releasable from said pin upon upward movement of said bridge plug moving means to release said resilient wall engaging tines, (g) the pin of said bridge plug moving means is detached from said bridge plug, which allows said wall engaging tines to spring into engagement with the wall of said bore hole to set said bridge plug at the desired depth in said bore hole, (h) said cup-shaped member being adapted to receive an explosive charge thereon, and
(1) said cup-shape of said bridge plug will direct the force of said explosive in said bore hole.

6. A bridge plug for the bore hole of a well as defined in claim 4, wherein (a) said cup-shaped, elastomer member has the open portion of the cup facing upwardly,
(1) so when a load placed on said cup-shaped elastomer member caused the circumference of said cup-shaped elastomer member to expand into substantially fluid tight sealing relation with the wall of said bore hole.

7. In a bridge plug for the bore hole of a well, (a) an expendable, cup-shaped, formable member, which member is axially apertured, (b) resilient wall engaging tines secured to the lower side of said cup-shaped, formable member,
(1) each said tine having a perforation formed therein near the distal end thereof, (c) a bridge plug seating member,
(1) a downwardly extending rod on the distal end of said bridge plug seating member,
(2) said rod being adapted to extend through said axial aperture in said cup-shaped, formable member, (d) said downwardly extending rod on said seating member being engageable with the perforations of said respective tines to retain said wall engaging tines in restrained position to enable said bridge plug to be moved into place in the bore hole of the well, (e) said downwardly extending rod on said seating member being adapted to release said wall engaging tines upon upward movement of said rod with said seating member with respect to said bridge plug.

References Cited in the file of this patent

UNITED STATES PATENTS

| | | |
|---|---|---|
| 2,739,653 | Haines | Mar. 27, 1956 |
| 2,822,876 | Murrow et al. | Feb. 11, 1958 |
| 3,039,534 | Koop | June 19, 1962 |